United States Patent [19]

Ando et al.

[11] Patent Number: 4,913,948
[45] Date of Patent: Apr. 3, 1990

[54] OPTICAL RECORDING MEDIUM

[75] Inventors: Eiji Ando, Katano; Junichi Hibino, Hirakata, both of Japan

[73] Assignee: Director-General of the Agency of Industrial Science and Technology, Tokyo, Japan

[21] Appl. No.: 249,177

[22] Filed: Sep. 26, 1988

[30] Foreign Application Priority Data

Apr. 11, 1988 [JP] Japan .................................. 63-87263

[51] Int. Cl.$^4$ .............................................. B32B 3/02
[52] U.S. Cl. ....................................... 428/64; 428/65; 428/913; 346/761; 346/135.1; 430/270; 430/495; 430/945; 369/288
[58] Field of Search ........................... 428/64, 65, 913; 430/270, 495, 945; 369/288; 346/766, 135.1

[56] References Cited

U.S. PATENT DOCUMENTS 3,867,192 2/1975 Hermans et al. ..................... 430/296
3,984,583 10/1976 Hermans et al. ..................... 428/913

OTHER PUBLICATIONS

CA 109:219728w Myazaki Optical Recording Media having Spirogyran.
CA 109:180182m Ando Controls of Photochromic Reactions in L B Films.
CA 108:46886v, Dec. 85, Miyazaki Optical Recording Media.
CA 107:246762t, 1987, Miyazaki Optical Recording Media.

Primary Examiner—Ellis P. Robinson
Assistant Examiner—P. J. Ryan
Attorney, Agent, or Firm—Stevens, Davis, Miller & Mosher

[57] ABSTRACT

The invention provides an optical recording medium comprising a Langmuir-Blodgett film made from a mixture of a photochromic compound of the following formula, in which a carboxyl group and an alkyl group have been introduced to the 8-position and the 1'-position, respectively, at the same time, and a long-chain carboxylic acid:

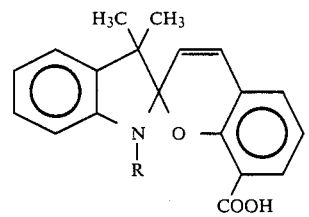

wherein R represents a hydrocarbon having 5 to 31 carbon atoms.

5 Claims, 1 Drawing Sheet

OPTICAL RECORDING MEDIUM

BACKGROUND OF THE INVENTION

This invention relates to an optical recording medium for making optical read and write of information by using an organic dye.

Photochromic compounds are known as a material which undergoes a reversible change of color upon exposure to two types of light source differing in wavelength. Typical examples of such photochromic compounds are spiropiran and fulgides. Application of these compounds to the optical recording media for binary memory by making use of said reversibility of the compounds has been proposed, but no successful attainment of their practical application is yet reported.

There are several problems in utilization of photochromic materials for an optical recording medium. One important problem is the unstability of the colored form (colorless form in the case of inverse photochromic material). Most of the known photochromic materials are poor in stability of colored form; the colored form returns to the colorless form when placed in a dark place. Therefore, when using such photochromic materials, it has been impossible to store the recorded information, and thus the use of such materials has been limited to the temporary memory type optical recording media.

Another important problem is the method for forming a thin film from said photochromic materials. The Langmuir-Blodgett method is an excellent technique for forming a uniform thin film. It has been however difficult to make a thin film from said materials by the Langmuir-Blodgett method because most of the known photochromic materials had a molecular structure with weak hydrophobicity.

SUMMARY OF THE INVENTION

The present invention has for its object to obtain an optical recording medium comprising a uniform ultrathin film and having a long recording life and excellent recording characteristics. For attaining this object, the invention provides an optical recording medium comprising a Langmuir-Blodgett film made of a spiropiran type photochromic compound of the following formula, in which a carboxyl group and an alkyl group have been introduced to the 8-position and the 1'-position, respectively, at the same time, and a long-chain carboxylic acid:

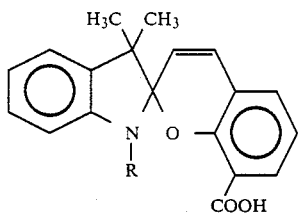

wherein R represents a hydrocarbon having 5 to 31 carbon atoms.

Said compound undergoes a molecular association when mixed with a fatty acid to make a Langmuir-Blodgett film, resulting in a remarkable enhancement of stability of the colored form as compared with the conventional spiropiran.

EXAMPLE 1

Figure 1:
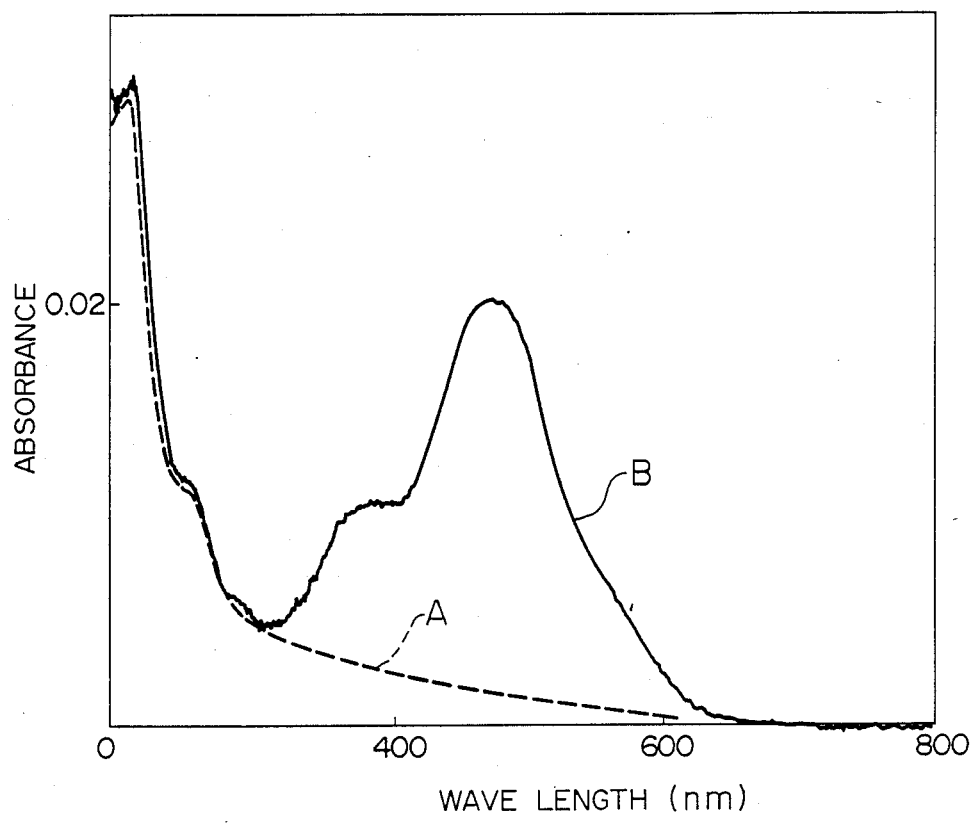
FIG. 1 shows the ultraviolet visible absorption spectra of the colorless form and the colored form of a Langmuir-Blodgett film made from a mixture of SP 3 and stearic acid, obtained in Example 1. (Curve A: colorless form; Curve B: colored form).

In this example, SP 3 of the following structure was used:

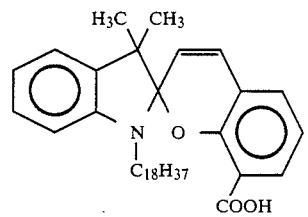

1 mmol of SP 3 and 2 mmol of stearic acid were dissolved in 1 liter of toluene. This mixture was spin coated (at 1,200 r.p.m.) on a quartz substrate to form a thin-film recording layer. This recording layer formed a colored version having the maximum absorption at a wavelength of 480 nm. This colored form was markedly improved in stability as compared with a Langmuir-Blodgett film made of SP 3 alone.

This recording layer became colorless on irradiation thereof with visible light of 480 nm in wavelength. It again returned to the colored form when irradiated with ultraviolet light of 360 nm. This color forming and losing process was reversible.

EXAMPLE 2

1 mmol of SP 3 and 2 mmol of stearic acid were dissolved in 1 liter of chloroform. By using this sample, a Langmuir-Blodgett film was made under the following conditions:
Substrate: a silica glass immersed in a 10% toluene solution of chlorotrimethylsilane for 10 minutes and then cleaned with trichloroethane
Trough: 140 mm×600 mm
Subphase: pH 7.0 phosphate buffer; 18° C.
Compression rate: 20 mm/min
Surface pressure: 18 mN/m
Deposition number of layers: 4

This recording layer produced a colored form having the maximum absorption at a wavelength of 480 nm (curve B in the drawing). This colored form showed $10^2$ times as high stability as the Langmuir-Blodgett film made of SP 3 alone (without containing stearic acid).

This recording layer turned into a colorless form upon irradiation with visible light of 480 nm in wavelength (curve A in the drawing). The colorless form returned to the colored form when irradiated with ultraviolet light of 360 nm. The above reactions were reversible.

Said recording layer had a uniform thickness of 10 nm.

The most preferred mixing ratio of stearic acid to SP 3 is ½. A similar effect can be obtained when said mixing ratio is 1/0.1 or higher. No significant effect of mixing of stearic acid was seen when said mixing ratio was less than 1/0.1.

As for the long-chain fatty acid to be mixed with spiropiran, stearic acid is most preferred. A similar effect can be obtained when using a long-chain fatty acid having 5 to 31 carbon atoms.

Regarding spiropiran used in this invention, SP 3 obtained by introducing a hydrocarbon of 18 carbon atoms to the nitrogen atom of indoline had good balance of hydrophilicity and hydrophobicity and could form the best Langmuir-Blodgett film. A similar effect was produced when C=14 to 22. With C=31 or above, it was difficult to obtain spiropiran. Spiropiran with C=5 or less was poor in balance of hydrophilicity and hydrophobicity and unable to form a desired Langmuir-Blodgett film.

What is claimed is:

1. An optical recording medium comprising a mixture of a photochromic compound represented by the following general formula in which a carboxyl group and an alkyl group have been introduced to the 8-position and the 1'-position, respectively, at the same time, and a long-chain carboxylic acid:

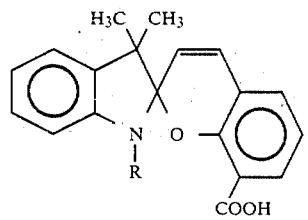

wherein R is a hydrocarbon chain having 5 to 31 carbon atoms.

2. An optical recording medium according to claim 1, having a recording layer comprising a Langmuir-Blodgett film of a photochromic compound.

3. An optical recording medium according to claim 1, wherein R in the general formula is a hydrocarbon chain having 14 to 22 carbon atoms.

4. An optical recording medium according to claim 1, wherein R in the general formula is a hydrocarbon chain having 18 carbon atoms.

5. An optical recording medium according to claim 1, using a long-chain carboxylic acid having 5 to 31 carbon atoms.

* * * * *